US008318000B2

United States Patent
Bhan et al.

(10) Patent No.: US 8,318,000 B2
(45) Date of Patent: Nov. 27, 2012

(54) METHOD OF PRODUCING A CRUDE PRODUCT

(75) Inventors: Opinder Kishan Bhan, Katy, TX (US); Scott Lee Wellington, Bellaire, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/348,293

(22) Filed: Jan. 11, 2012

(65) Prior Publication Data

US 2012/0116145 A1 May 10, 2012

Related U.S. Application Data

(62) Division of application No. 12/421,763, filed on Apr. 10, 2009, now Pat. No. 8,114,806.

(60) Provisional application No. 61/043,926, filed on Apr. 10, 2008.

(51) Int. Cl.
*C10L 1/00* (2006.01)
*C10L 1/04* (2006.01)
*C10L 1/10* (2006.01)
*C10L 5/00* (2006.01)
*H01B 3/22* (2006.01)
*C10C 3/00* (2006.01)
*C10G 47/00* (2006.01)
*C10G 47/02* (2006.01)
*C10G 47/04* (2006.01)
*C10G 11/00* (2006.01)
*C10G 11/02* (2006.01)
*C10G 11/04* (2006.01)
*C10G 35/06* (2006.01)
*C10G 35/00* (2006.01)
*C10G 35/10* (2006.01)
*C10G 29/04* (2006.01)
*C10G 25/00* (2006.01)
*B01J 21/00* (2006.01)
*B01J 23/00* (2006.01)

(52) U.S. Cl. .......... 208/14; 208/15; 208/40; 208/111.3; 208/112; 208/120.3; 208/120.35; 208/121; 208/124; 208/137; 208/146; 208/295; 208/299; 44/300; 44/628; 502/240; 502/254; 502/255; 502/256; 502/263; 502/305; 502/313; 502/319; 502/321; 502/322; 502/323; 502/325

(58) Field of Classification Search .......... 502/240, 502/254–256, 263, 305, 313, 319, 321–323, 502/325; 44/300, 628; 585/1, 14; 208/14, 208/15, 40, 111.3, 112, 120.3, 120.35, 121, 208/124, 137, 146, 295, 299
See application file for complete search history.

(56) References Cited

U.S. PATENT DOCUMENTS 4,257,922 A * 3/1981 Kim et al. ............ 502/315
(Continued)

FOREIGN PATENT DOCUMENTS

CA 1 163 614 * 3/1984
(Continued)

*Primary Examiner* — Patricia L Hailey (57) ABSTRACT

A method of producing a crude product from a hydrocarbon feed is provided. A hydrocarbon feed is contacted with a catalyst containing a Col. 6-10 metal or compound thereof to produce the crude product, where the catalyst has a pore size distribution with a median pore diameter ranging from 105 Å to 150 Å, with 60% of the total number of pores in the pore size distribution having a pore diameter within 60 Å of the median pore diameter, with at least 50% of its pore volume in pores having a pore diameter of at most 600 Å, and between 5% and 25% of its pore volume in pores having a pore diameter between 1000 Å and 5000 Å.

12 Claims, 1 Drawing Sheet

U.S. PATENT DOCUMENTS

| | | |
|---|---|---|
| 8,114,806 B2 * | 2/2012 | Bhan et al. .................... 502/305 |
| 8,163,166 B2 * | 4/2012 | Wellington et al. ............. 208/14 |
| 8,178,468 B2 * | 5/2012 | Bhan et al. .................... 502/305 |
| 2005/0139520 A1 * | 6/2005 | Bhan et al. .................... 208/115 |
| 2007/0295645 A1 * | 12/2007 | Brownscombe et al. ....... 208/91 |
| 2008/0083650 A1 * | 4/2008 | Bhan et al. ..................... 208/46 |
| 2008/0083655 A1 * | 4/2008 | Bhan et al. ............... 208/120.35 |
| 2008/0135449 A1 * | 6/2008 | Bhan et al. ..................... 208/85 |
| 2009/0255851 A1 * | 10/2009 | Bhan et al. ..................... 208/15 |
| 2010/0089794 A1 * | 4/2010 | Bhan et al. ..................... 208/15 |
| 2012/0175286 A1 * | 7/2012 | Bhan et al. ..................... 208/15 |

FOREIGN PATENT DOCUMENTS

| | | | |
|---|---|---|---|
| WO | 2006/110546 | * | 10/2006 |
| WO | 2008/016969 | * | 2/2008 |
| WO | 2008/016971 | * | 2/2008 |

* cited by examiner

METHOD OF PRODUCING A CRUDE PRODUCT

This patent application is a divisional application claiming the benefit of priority of U.S. patent application Ser. No. 12/421,763, filed Apr. 10, 2009, which claimed the benefit of priority of U.S. Provisional Application 61/043,926, filed Apr. 10, 2008, each of which is incorporated herein by reference.

FIELD OF THE INVENTION

The present invention relates to a method of producing a crude product.

BACKGROUND OF THE INVENTION

Crude oils that have one or more unsuitable properties that do not allow the crudes to be economically transported, or processed using conventional facilities, are commonly referred to as "disadvantaged crudes". Disadvantaged crudes may have a high viscosity that renders the disadvantaged crude undesirable for conventional transportation and/or treatment facilities. Disadvantaged crudes having high viscosities, additionally, may also include hydrogen deficient hydrocarbons. When processing disadvantaged crudes having hydrogen deficient hydrocarbons, consistent quantities of hydrogen may need to be added to inhibit coke formation, particularly if elevated temperatures and high pressure are used to process the disadvantaged crude. Hydrogen, however, is costly to produce and/or costly to transport to treatment facilities.

Conventional methods of reducing the high viscosity of the disadvantaged crude include contacting the disadvantaged crude at elevated temperatures and pressure with hydrogen in the presence of a catalyst. Sediment formed during processing may accumulate in the larger pores of the catalyst while viscosity and/or other properties are reduced by contact of the feed with the active metals in the smaller pores of the catalyst that the sediment and/or large compounds contributing to viscosity can not enter. Disadvantages of conventional catalysts are that they require significant amounts of hydrogen in order to process the hydrogen deficient hydrocarbons and that the larger pores of the catalyst become filled. Thus, the activity of the catalyst is diminished and the life of the catalyst is reduced. To counteract the diminished activity and/or increase throughput per volume of feed, the catalyst may contain a significant amount of metal and/or combination of metals. As more metal is used in a catalyst, the pores of the catalyst become filled resulting in catalyst that have that are diminished pore size due to the metal occupying space in the pore. To accommodate more metal, catalysts with larger pore diameters may be made, however, an increase in pore diameter may reduce the surface area of the catalyst.

It would be desirable to have a process and/or catalyst for reducing the viscosity of a disadvantaged crude at selected temperatures and minimal pressures. Such a catalyst could be used at elevated temperatures and minimal pressures.

U.S. Pat. No. 4,225,421 to Hensley; U.S. Pat. No. 5,928,499 to Sherwood, Jr. et al U.S. Pat. No. 6,554,994 to Reynolds et al., U.S. Pat. No. 6,436,280 to Harle et al., U.S. Pat. No. 5,928,501 to Sudhakar et al., U.S. Pat. No. 4,937,222 to Angevine et al., U.S. Pat. No. 4,886,594 to Miller, U.S. Pat. No. 4,746,419 to Peck et al., U.S. Pat. No. 4,548,710 to Simpson, U.S. Pat. No. 4,525,472 to Morales et al., U.S. Pat. No. 4,499,203 to Toulhoat et al., U.S. Pat. No. 4,389,301 to Dahlberg et al., and U.S. Pat. No. 4,191,636 to Fukui et al. describe various processes, systems, and catalysts for processing crudes and/or disadvantaged crudes.

U.S. Published Patent Application Nos. 20050133414 through 20050133418 to Bhan et al.; 20050139518 through 20050139522 to Bhan et al., 20050145543 to Bhan et al., 20050150818 to Bhan et al., 20050155908 to Bhan et al., 20050167320 to Bhan et al., 20050167324 through 20050167332 to Bhan et al., 20050173301 through 20050173303 to Bhan et al., 20060060510 to Bhan; 20060231465 to Bhan; 20060231456 to Bhan; 20060234876 to Bhan; 20060231457 to Bhan and 20060234877 to Bhan; 20070000810 to Bhan et al.; 20070000808 to Bhan; 20070000811 to Bhan et al., and U.S. patent application Ser. Nos. 11/866,909; 11/866,916; 11/866,921 through Ser. Nos. 11/866,923; 11/866,926; 11/866,929 and 11/855,932 to Bhan et al., filed Oct. 3, 2007, are related patent applications and describe various processes, systems, and catalysts for processing crudes and/or disadvantaged crudes.

U.S. Pat. No. 4,225,421 to Hensley et al. describes a catalyst having a bimodal pore structure and improved effectiveness in the desulfurization and demetallation of metal-containing hydrocarbon streams. This catalyst has a surface area between 140 and 300 $m^2/g$, 60-95% of its pore volume in pores having a pore diameter from 2-200 Å, 1-15% of its pore volume in pores having a pore diameter from 200-600 Å, and 3-30% of its pore volume in pores having a pore diameter from 600-10,000 Å as determined using nitrogen adsorption methods. Operating pressures range from 5.5 MPa to 20.7 MPa. Operating temperatures range from 371° C. to 454° C. In Tables I through III, the average pore diameter of the catalysts range from 137 Å to 162 Å.

U.S. Pat. No. 5,928,499 to Sherwood, Jr. et al. describes a process for hydrotreating a hydrocarbon feed containing components boiling above 1000° F. and sulfur, metals and carbon residue utilizing a heterogeneous catalyst having a specified pore size distribution, median pore diameter by surface area and pore mode by volume, to give a product containing a decreased content of components boiling above 1000° F., decreased sulfur, metals and carbon residue is disclosed. The catalyst includes an porous alumina support containing less than or equal to 2.5 wt % silica on a finished catalyst basis, and bearing 2.2 wt % to 6 wt % of a Group VIII metal oxide, 7 wt % to 24 wt % of a Group VIB metal oxide and preferably less than 0.2 wt % of a phosphorous oxide. The catalyst may be characterized as having a total surface area of 215 to 245 $m^2/g$, a total pore volume of 0.82 to 0.98 cc/g, a median pore diameter by surface area of 91 to 104 Å, and a pore diameter distribution in which 22.0 to 33.0% of the total pore volume is present as macropores of a diameter greater than 250 Å, 67.0 to 78.0% of the total pore volume is present as micropores of a diameter less that 250 Å. The pore volumes were determined using mercury porosity measurements. Operating pressures range from 1800-2500 psig (approximately 12 MPa to 17 MPa. Operating temperatures range from 700° F. to 900° F. (371° C. to 384° C.).

U.S. Pat. No. 5,221,656 to Clark et al. describes a hydroprocessing catalyst that has a surface area of greater than 220 $m^2/g$, a pore volume of about 0.23-0.30 cc/g in pores greater than about 600 radius Å, an average pore radius of about 30-70 Å in pores less than 600 Å, and an incremental pore volume curve with a maximum at about 25-50 Å radius. The hydrocarbon feed is contacted with the catalyst at an operating pressures range of about 13.8 MPa (2000 psig) and a temperature of 421° C. (790° F.).

As outlined above, there has been considerable effort to develop methods and systems to economically convert disadvantaged crudes to useable products. It would be advantageous to be able to convert crudes with a high viscosity, and therefore a low economic value, into a crude product having a decreased viscosity content by contacting the crudes with a catalyst with a minimal amount of sediment formation. It would also be advantageous to consume a minimal amount of hydrogen during processing. The resulting crude product may, thereafter, be converted to selected hydrocarbon products using conventional hydrotreating catalysts.

SUMMARY OF THE INVENTION

It has now been found that a hydrocarbon feed with a high viscosity can be converted into a crude product having a decreased viscosity whilst sediment formation is kept low by using a specific catalyst. As a result the catalyst may have a long useful life. In addition, it has been found that such a conversion may be carried out with minimal hydrogen consumption.

Accordingly, the present invention is directed to a method of producing a crude product, comprising:
contacting a hydrocarbon feed with a catalyst to produce a total product that includes the crude product, wherein the catalyst comprises a metal from Col. 6-10 of the Periodic Table, a compound thereof, or a mixture of the metal and a compound thereof; wherein the catalyst has a median pore diameter ranging from 105 Å to 150 Å with at least 60% of the total number of pores in the pore size distribution having a pore diameter within at least 60 Å of the median pore diameter, with at least 50% of its pore volume in pores having a pore diameter of at most 600 Å, and between 5% and 25% of its pore volume in pores having a pore diameter between 1000 Å and 5000 Å, wherein pore diameters and pore volumes are as measured by ASTM Method D4284.

BRIEF DESCRIPTION OF THE DRAWINGS

The invention has been illustrated by the following figure.

DETAILED DESCRIPTION OF THE INVENTION

Terms used herein are defined as follows.

"ASTM" refers to American Standard Testing and Materials.

"API gravity" refers to API gravity at 15.5° C. (60° F.). API gravity is as determined by ASTM Method D6822.

Atomic hydrogen percentage and atomic carbon percentage of the hydrocarbon feed and the crude product are as determined by ASTM Method D5291.

"Bimodal catalyst" refers to a catalyst in which at least the majority of the pore volume is distributed in two statistical distributions of pore diameters, each statistical distribution having a significant peak when displayed on a pore volume versus pore diameter plot. For example, a bimodal catalyst may have 30% of its pore volume distributed in pores having a pore diameter between 50 Å and 100 Å (with a peak showing at 80 Å) and 25% of its pore volume distributed in pores having a pore diameter between 300 Å and 350 Å (with a peak showing at 320 Å).

Boiling range distributions for the hydrocarbon feed, the total product, and/or the crude product are as determined by ASTM Method D5307 unless otherwise mentioned.

"$C_5$ asphaltenes" refers to asphaltenes that are insoluble in n-pentane. $C_5$ asphaltenes content is as determined by ASTM Method D2007.

"$C_7$ asphaltenes" refers to asphaltenes that are insoluble in n-heptane. $C_7$ asphaltenes content is as determined by ASTM Method D3279.

"Column X metal(s)" refers to one or more metals of Column X of the Periodic Table and/or one or more compounds of one or more metals of Column X of the Periodic Table, in which X corresponds to a column number (for example, 1-12) of the Periodic Table. For example, "Column 6 metal(s)" refers to one or more metals from Column 6 of the Periodic Table and/or one or more compounds of one or more metals from Column 6 of the Periodic Table.

"Column X element(s)" refers to one or more elements of Column X of the Periodic Table, and/or one or more compounds of one or more elements of Column X of the Periodic Table, in which X corresponds to a column number (for example, 13-18) of the Periodic Table. For example, "Column 15 element(s)" refers to one or more elements from Column 15 of the Periodic Table and/or one or more compounds of one or more elements from Column 15 of the Periodic Table.

In the scope of this application, weight of a metal from the Periodic Table, weight of a compound of a metal from the Periodic Table, weight of an element from the Periodic Table, or weight of a compound of an element from the Periodic Table is calculated as the weight of metal or the weight of element. For example, if 0.1 grams of $MoO_3$ is used per gram of catalyst, the calculated weight of the molybdenum metal in the catalyst is 0.067 grams of molybdenum metal per gram of catalyst.

"Comulling" refers to contacting, combining, or pulverizing of at least two substances together such that at least two substances are mixed through mechanical and physical forces. Comulling can form a substantially uniform or homogeneous mixture. Comulling includes the contacting of substances to yield a paste that can be extruded or formed into extrudate particles, spheroids, pills, tablets, cylinders, irregular extrusions or loosely bound aggregates or clusters, by any known extrusion, molding tableting, pressing, pelletizing, or tumbling methods. Comulling does not include impregnation methods in which a formed solid is immersed in a liquid or gas to absorb/adsorb components from the liquid or gas.

"Content" refers to the weight of a component in a substrate (for example, a hydrocarbon feed, a total product, or a crude product) expressed as weight fraction or weight percentage based on the total weight of the substrate. "Wtppm" refers to parts per million by weight.

"Distillate" refers to hydrocarbons with a boiling range distribution between 182° C. (360° F.) and 343° C. (650° F.) at 0.101 MPa. Distillate content is as determined by ASTM Method D5307.

"Heteroatoms" refers to oxygen, nitrogen, and/or sulfur contained in the molecular structure of a hydrocarbon. Heteroatoms content is as determined by ASTM Methods E385 for oxygen, D5762 for total nitrogen, and D4294 for sulfur. "Total basic nitrogen" refers to nitrogen compounds that have a pKa of less than 40. Basic nitrogen ("bn") is as determined by ASTM Method D2896.

"Hydrocarbon feed/total product" refers to the mixture that contacts the catalyst during processing.

"Hydrogen source" refers to a source of hydrogen and includes hydrogen gas and/or a compound and/or compounds that when in the presence of a hydrocarbon feed and the catalyst react to provide hydrogen. A hydrogen source may include, but is not limited to, hydrocarbons (for example, $C_1$ to $C_4$ hydrocarbons such as methane, ethane, propane, and butane), water, or mixtures thereof. A mass balance may be conducted to assess the net amount of hydrogen provided.

"LHSV" refers to a volumetric liquid feed rate per total volume of catalyst and is expressed in hours ($h^{-1}$). Total volume of catalyst is calculated by summation of all catalyst volumes in the contacting zones, as described herein.

"Liquid mixture" refers to a composition that includes one or more compounds that are liquid at standard temperature and pressure (25° C., 0.101 MPa, hereinafter referred to as "STP"), or a composition that includes a combination of one of more compounds that are liquid at STP with one or more compounds that are solids at STP.

"Metals in metal salts of organic acids" refer to alkali metals, alkaline-earth metals, zinc, arsenic, chromium, or combinations thereof. A content of metals in metal salts of organic acids is as determined by ASTM Method D1318.

"Micro-Carbon Residue" ("MCR") content refers to a quantity of carbon residue remaining after evaporation and pyrolysis of a substrate. MCR content is as determined by ASTM Method D4530.

"Molybdenum content in the hydrocarbon feed" refers to the content of molybdenum in the feed. The molybdenum content includes the amount of inorganic molybdenum and organomolybdenum in the feed. Molybdenum content in the hydrocarbon feed is as determined by ASTM Method D5807.

"Monomodal catalyst" refers to a catalyst in which at least the majority of the pore volume is distributed in one statistical distribution of pore diameters, the statistical distribution having a significant peak when displayed on a pore volume versus pore diameter plot. For example, a monomodal catalyst may have 50% of its pore volume in pores having a pore diameter between 70 Å and 300 Å (with a peak at 150 Å).

"Naphtha" refers to hydrocarbon components with a boiling range distribution between 38° C. (100° F.) and 182° C. (360° F.) at 0.101 MPa. Naphtha content is as determined by ASTM Method D5307.

"Ni/V/Fe" refers to nickel, vanadium, iron, or combinations thereof.

"Ni/V/Fe content" refers to the content of nickel, vanadium, iron, or combinations thereof. The Ni/V/Fe content includes inorganic nickel, vanadium and iron compounds and/or organonickel, organovanadium, and organoiron compounds. The Ni/V/Fe content is as determined by ASTM Method D5708.

"$Nm^3/m^3$" refers to normal cubic meters of gas per cubic meter of hydrocarbon feed.

"Non-condensable gas" refers to components and/or mixtures of components that are gases at STP.

"P (peptization) value" or "P-value" refers to a numeral value, which represents the flocculation tendency of asphaltenes in the hydrocarbon feed. P-Value is as determined by ASTM Method D7060.

"Periodic Table" refers to the Periodic Table as specified by the International Union of Pure and Applied Chemistry (IUPAC), November 2003.

"Pore diameter", "median pore diameter", and "pore volume" refer to pore diameter, median pore diameter, and pore volume, as determined by ASTM Method D4284 (mercury porosimetry at a contact angle equal to 140°). A micromeritics® A9220 instrument (Micromeritics Inc., Norcross, Ga., U.S.A.) may be used to determine these values.

"Residue" refers to components that have a boiling range distribution above 538° C. (1000° F.), as determined by ASTM Method D5307.

"Sediment" refers to impurities and/or coke that are insoluble in the hydrocarbon feed/total product mixture. Sediment is as determined by ASTM Method D4807. Sediment may also be determined by the Shell Hot Filtration Test ("SHFST") as described by Van Kernoort et al. in the Jour. Inst. Pet., 1951, pages 596-604.

"SCFB" refers to standard cubic feet of gas per barrel of hydrocarbon feed.

"Surface area" of a catalyst is as determined by ASTM Method D3663.

"VGO" refers to hydrocarbons with a boiling range distribution between 343° C. (650° F.) and 538° C. (1000° F.) at 0.101 MPa. VGO content is as determined by ASTM Method D5307.

"Viscosity" refers to kinematic viscosity at 37.8° C. (100° F.). Viscosity is as determined using ASTM Method D445.

"Hydrocarbon feed" refers to a feed that includes hydrocarbons. Hydrocarbon feed may include, but is not limited to, crudes, disadvantaged crudes, stabilized crudes, hydrocarbons obtained from refinery processes, or mixtures thereof. Examples of hydrocarbon feed obtained from refinery processes include, but are not limited to, long residue, short residue, naphtha, gasoil and/or hydrocarbons boiling above 538° C. (1000° F.), or mixtures thereof.

In one embodiment the hydrocarbon feed is a crude, herein also referred to as crude feed. Crude or crude feed refers to a feed of hydrocarbons which has been produced and/or retorted from hydrocarbon containing formations and which has not yet been distilled and/or fractionally distilled in a treatment facility to produce multiple components with specific boiling range distributions, such as atmospheric distillation methods and/or vacuum distillation methods. Crudes may be solid, semi-solid, and/or liquid. Crudes may include for example coal, bitumen, tar sands or crude oil. The crude or crude feed may be stabilized to form a stabilized crude, also referred to as stabilized crude feed. Stabilization may include, but is not limited to, removal of non-condensable gases, water, salts, or combinations thereof from the crude to form a stabilized crude. Such stabilization may often occur at, or proximate to, the production and/or retorting site.

Stabilized crudes have not been distilled and/or fractionally distilled in a treatment facility to produce multiple components with specific boiling range distributions (for example, naphtha, distillates, VGO, and/or lubricating oils). Distillation includes, but is not limited to, atmospheric distillation methods and/or vacuum distillation methods. Undistilled and/or unfractionated stabilized crudes may include components that have a carbon number above 4 in quantities of at least 0.5 grams of components per gram of crude. Examples of stabilized crudes include whole crudes, topped crudes, desalted crudes, desalted topped crudes, or combinations thereof.

"Topped" refers to a crude that has been treated such that at least some of the components that have a boiling point below 35° C. at 0.101 MPa (95° F. at 1 atm) have been removed. Topped crudes may have a content of at most 0.1 grams, at most 0.05 grams, or at most 0.02 grams of such components per gram of the topped crude.

Some stabilized crudes have properties that allow the stabilized crudes to be transported to conventional treatment facilities by transportation carriers (for example, pipelines, trucks, or ships). Other crudes have one or more unsuitable properties that render them disadvantaged.

Disadvantaged crudes may be unacceptable to a transportation carrier and/or a treatment facility, thus imparting a low economic value to the disadvantaged crude. The economic value may be such that a reservoir that includes the disadvantaged crude is deemed too costly to produce, transport, and/or treat.

The properties of the hydrocarbon feed, such as for example the crudes or disadvantaged crudes, may vary widely.

The hydrocarbon feed, such as for example a crude feed, may have a viscosity of at least 10 cSt at 37.8° C., at least 100 cSt, at least 1000 cSt, or at least 2000 cSt at 37.8° C.

The hydrocarbon feed, such as for example a crude feed, may have an API gravity of at most 19, at most 15, or at most 10. It may further have an API gravity of at least 5.

The hydrocarbon feed, such as for example a crude feed, may have a total Ni/V/Fe content of at least 0.00002 grams or at least 0.0001 grams of Ni/V/Fe per gram of hydrocarbon feed;

The hydrocarbon feed, such as for example a crude feed, may have a total heteroatoms content of at least 0.005 grams of heteroatoms per gram of hydrocarbon feed;

In some embodiments, the hydrocarbon feed has at least 0.001 grams of oxygen containing compounds per gram of hydrocarbon feed, and wherein the crude product has a oxygen containing compounds content of at most 90% of the hydrocarbon feed oxygen-containing compounds content, wherein oxygen is as determined by ASTM Method E385.

The hydrocarbon feed, such as for example a crude feed, may have a residue content of at least 0.01 grams of residue per gram of hydrocarbon feed. In some embodiments, the hydrocarbon or crude feed may include, per gram of feed, at least 0.2 grams of residue, at least 0.3 grams of residue, at least 0.5 grams of residue, or at least 0.9 grams of residue.

The hydrocarbon feed, such as for example a crude feed, may have per gram of hydrocarbon feed, a sulfur content of at least 0.005, at least 0.01, or at least 0.02 grams.

The hydrocarbon feed, such as for example a crude feed, may have a $C_5$ asphaltenes content of at least 0.04 grams or at least 0.08 grams of $C_5$ asphaltenes per gram of hydrocarbon feed; and/or at least 0.02 grams or at least 0.04 grams of $C_7$ asphaltenes per gram of hydrocarbon feed.

The hydrocarbon feed, such as for example a crude feed, may have a MCR content of at least 0.002 grams of MCR per gram of hydrocarbon feed The hydrocarbon feed, such as for example a crude feed, may have a content of metals in metal salts of organic acids of at least 0.00001 grams of metals per gram of hydrocarbon feed The hydrocarbon feed, such as for example a crude feed, may further have a molybdenum content of at least 0.1 wtppm;

The hydrocarbon feed, such as for example a crude feed, may further have any kind of combination of the above mentioned properties.

The hydrocarbon feed, such as for example a crude feed, may include per gram of feed: at least 0.001 grams, at least 0.005 grams, or at least 0.01 grams of hydrocarbons with a boiling range distribution between 95° C. and 200° C. at 0.101 MPa; at least 0.001 grams, at least 0.005 grams, or at least 0.01 grams of hydrocarbons with a boiling range distribution between 200° C. and 300° C. at 0.101 MPa; at least 0.001 grams, at least 0.005 grams, or at least 0.01 grams of hydrocarbons with a boiling range distribution between 300° C. and 400° C. at 0.101 MPa; and at least 0.001 grams, at least 0.005 grams, or at least 0.01 grams of hydrocarbons with a boiling range distribution between 400° C. and 650° C. at 0.101 MPa.

In a further embodiment, the hydrocarbon feed, such as for example a crude feed, may include per gram of feed: at least 0.001 grams, at least 0.005 grams, or at least 0.01 grams of hydrocarbons with a boiling range distribution of at most 100° C. at 0.101 MPa; at least 0.001 grams, at least 0.005 grams, or at least 0.01 grams of hydrocarbons with a boiling range distribution between 100° C. and 200° C. at 0.101 MPa; at least 0.001 grams, at least 0.005 grams, or at least 0.01 grams of hydrocarbons with a boiling range distribution between 200° C. and 300° C. at 0.101 MPa; at least 0.001 grams, at least 0.005 grams, or at least 0.01 grams of hydrocarbons with a boiling range distribution between 300° C. and 400° C. at 0.101 MPa; and at least 0.001 grams, at least 0.005 grams, or at least 0.01 grams of hydrocarbons with a boiling range distribution between 400° C. and 650° C. at 0.101 MPa.

Some hydrocarbon feeds or crude feeds may include, per gram of feed, at least 0.001 grams, at least 0.005 grams, or at least 0.01 grams of hydrocarbons with a boiling range distribution of at most 100° C. at 0.101 MPa, in addition to higher boiling components. Typically, a disadvantaged crude has, per gram of disadvantaged crude, a content of such hydrocarbons of at most 0.2 grams or at most 0.1 grams.

Some hydrocarbon feeds or crude feeds may include, per gram of feed, at least 0.001 grams, at least 0.005 grams, or at least 0.01 grams of hydrocarbons with a boiling range distribution of at least 200° C. at 0.101 MPa.

Some hydrocarbon feeds or crude feeds may include, per gram of feed, at least 0.001 grams, at least 0.005 grams, or at least 0.01 grams of hydrocarbons with a boiling range distribution of at least 650° C.

Examples of crudes that might be treated using the processes described herein include, but are not limited to, crudes from the following regions of the world: U.S. Gulf Coast and southern California, Canada Tar sands, Brazilian Santos and Campos basins, Egyptian Gulf of Suez, Chad, United Kingdom North Sea, Angola Offshore, Chinese Bohai Bay, Venezuelan Zulia, Malaysia, and Indonesia Sumatra. The hydrocarbon feed may be topped, as described herein.

Treatment of disadvantaged crudes may enhance the properties of the disadvantaged crudes such that the crudes are acceptable for transportation and/or treatment. The crude product resulting from treatment of the hydrocarbon feed, as described herein, is generally suitable for transporting and/or treatment. Properties of the crude product produced as described herein are closer to the corresponding properties of West Texas Intermediate crude than the hydrocarbon feed, or closer to the corresponding properties of Brent crude, than the hydrocarbon feed, thereby enhancing the economic value of the hydrocarbon feed. Such crude product may be refined with less or no pre-treatment, thereby enhancing refining efficiencies. Pre-treatment may include desulfurization, demetallization, and/or atmospheric distillation to remove impurities.

For example, in some embodiments, removal of at least a portion of the organometallic compounds and/or metals from the hydrocarbon feed is performed before the hydrocarbon feed is contacted with other catalysts. For example, a small amount of organomolybdenum and/or organocopper (for example, at most 50 wtppm, at most 20 wtppm, or at most 10 wtppm) in a hydrocarbon feed may reduce the activity of a catalyst upon contact of the hydrocarbon feed with the catalyst.

The accumulation of deposits or insoluble components in the reactor may lead to a pressure change in the contacting zone, thus inhibiting hydrocarbon feed from passing through the contacting zone at desired flow rates. For example, the inlet pressure of the contacting zone may increase rapidly over a short period of time as compared to the starting pressure. A rapid increase in pressure may indicate plugging of the catalyst. A change in pressure of at least 3 MPa, at least 5 MPa, at least 7 MPa, or at least 10 MPa over a short period of time may indicate catalyst plugging.

Treatment of a hydrocarbon feed in accordance with embodiments described herein may include contacting the hydrocarbon feed with the catalyst(s) in a contacting zone and/or combinations of two or more contacting zones. In a contacting zone, at least one property of a hydrocarbon feed may be changed by contact of the hydrocarbon feed with one or more catalysts relative to the same property of the hydrocarbon feed. In some embodiments, contacting is performed in the presence of a hydrogen source. In some embodiments, the hydrogen source is hydrogen gas. In some embodiments, the hydrogen source is one or more hydrocarbons that, under certain contacting conditions, react to provide relatively small amounts of hydrogen to compound(s) in the hydrocarbon feed.

Figure 1:
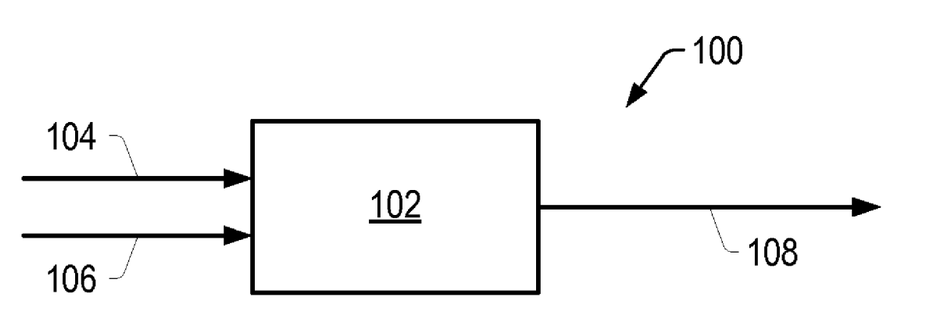
FIG. 1 is a schematic of an embodiment of a contacting system.

FIG. 1 is a schematic of contacting system 100 that includes contacting zone 102. The hydrocarbon feed enters upstream contacting zone 102 via hydrocarbon feed conduit 104. A contacting zone may be a reactor, a portion of a reactor, multiple portions of a reactor, or combinations thereof. Examples of a contacting zone include a stacked bed reactor, a fixed bed reactor, an ebullating bed reactor, a continuously stirred tank reactor ("CSTR"), a fluidized bed reactor, a spray reactor, and a liquid/liquid contactor. Configuration of one or more contacting zones is described in U.S. Published Patent Application No. 20050133414 to Bhan et al., which is incorporated herein by reference. In certain embodiments, the contacting system is on or coupled to an offshore facility. Contact of the hydrocarbon feed with catalyst(s) in contacting system 100 may be a continuous process or a batch process.

The contacting zone may include one or more catalysts (for example, two catalysts). In some embodiments, contact of the hydrocarbon feed with a first catalyst of the two catalysts may reduce viscosity of the hydrocarbon feed. Subsequent contact of the reduced viscosity hydrocarbon feed with the second catalyst may decrease metal content and/or heteroatom content. In other embodiments, residue content, MCR content or combinations of these properties of the crude product change by at least 10% relative to the same properties of the hydrocarbon feed after contact of the hydrocarbon feed with one or more catalysts.

In certain embodiments, a volume of catalyst in the contacting zone is in a range from 10 vol % to 60 vol %, 20 vol % to 50 vol %, or 30 vol % to 40 vol % of a total volume of hydrocarbon feed in the contacting zone. In some embodiments, a slurry of catalyst and hydrocarbon feed may include from 0.001 grams to 10 grams, 0.005 grams to 5 grams, or 0.01 grams to 3 grams of catalyst per 100 grams of hydrocarbon feed in the contacting zone. Contacting conditions in the contacting zone may include, but are not limited to, temperature, pressure, hydrogen source flow, hydrocarbon feed flow, or combinations thereof.

Contacting conditions in some embodiments are controlled to produce a crude product with specific properties. Temperature in the contacting zone may range from 50° C. to 500° C., preferably from 100° C. to 450° C. In some embodiments, temperature in a contacting zone may range from 350° C. to 450° C., from 360° C. to 440° C., or from 370° C. to 430° C. LHSV of the hydrocarbon feed will generally range from $0.1\ h^{-1}$ to $30\ h^{-1}$, $0.4\ h^{-1}$ to $25\ h^{-1}$, $0.5\ h^{-1}$ to $20\ h^{-1}$, $1\ h^{-1}$ to $15\ h^{-1}$, $1.5\ h^{-1}$ to $10\ h^{-1}$, or $2\ h^{-1}$ to $5\ h^{-1}$. In some embodiments, LHSV is at least $5\ h^{-1}$, at least $11\ h^{-1}$, at least $15\ h^{-1}$, or at least $20\ h^{-1}$. A partial pressure of hydrogen in the contacting zone may range from 0.1 MPa to 8 MPa, 1 MPa to 7 MPa, 2 MPA to 6 MPa, or 3 MPa to 5 MPa. In some embodiments, a partial pressure of hydrogen may be at most 7 MPa, at most 6 MPa, at most 5 MPa, at most 4 MPa, at most 3 MPa, or at most 3.5 MPa. In some embodiments, a partial pressure of hydrogen is the same as the total pressure of the contacting zone.

In embodiments in which the hydrogen source is supplied as a gas (for example, hydrogen gas), a ratio (as determined at normal conditions of 20° C. temperature and 1.013 bar pressure, also referred to as $Nm^3/m^3$) of the gaseous hydrogen source to the hydrocarbon feed typically ranges from $0.1\ Nm^3/m^3$ to $100{,}000\ Nm^3/m^3$, $0.5\ Nm^3/m^3$ to $10{,}000\ Nm^3/m^3$, $1\ Nm^3/m^3$ to $8{,}000\ Nm^3/m^3$, $2\ Nm^3/m^3$ to $5{,}000\ Nm^3/m^3$, $5\ Nm^3/m^3$ to $3{,}000\ Nm^3/m^3$, or $10\ Nm^3/m^3$ to $800\ Nm^3/m^3$. The hydrogen source, in some embodiments, is combined with carrier gas(es) and recirculated through the contacting zone. Carrier gas may be, for example, nitrogen, helium, and/or argon. The carrier gas may facilitate flow of the hydrocarbon feed and/or flow of the hydrogen source in the contacting zone(s). The carrier gas may also enhance mixing in the contacting zone(s). In some embodiments, a hydrogen source (for example, hydrogen, methane or ethane) may be used as a carrier gas and recirculated through the contacting zone.

The hydrogen source may enter contacting zone 102 co-currently with the hydrocarbon feed via hydrocarbon feed conduit 104 or separately via gas conduit 106. In contacting zone 102, contact of the hydrocarbon feed with a catalyst produces a total product that includes a crude product, and, in some embodiments, gas. In some embodiments, a carrier gas is combined with the hydrocarbon feed and/or the hydrogen source in conduit 106. The total product may exit contacting zone 102 and be transported to other processing zones, storage vessels, or combinations thereof via conduit 108.

In some embodiments, the total product may contain processing gas and/or gas formed during processing. Such gases may include, for example, hydrogen sulfide, carbon dioxide, carbon monoxide, excess gaseous hydrogen source, and/or a carrier gas. If necessary, the excess gas may be separated from the total product and recycled to contacting system 100, purified, transported to other processing zones, storage vessels, or combinations thereof. In some embodiments, gas produced during the process is at most 10 vol % based on total product, at most 5 vol % based on total product, or at most 1 vol % based the total product produced. In some embodiments, minimal or non-detectable amounts of gas are produced during contact of the feed with the catalyst. In such cases, the total product is considered the crude product.

In some embodiments, crude (either topped or untopped) is separated prior to contact with one or more catalysts in contacting zone 102. During the separation process, at least a portion of the crude is separated using techniques known in the art (for example, sparging, membrane separation, pressure reduction) to produce the hydrocarbon feed. For example, water may be at least partially separated from the crude. In another example, components that have a boiling range distribution below 95° C. or below 100° C. may be at least partially separated from the crude to produce the hydrocarbon feed. In some embodiments, at least a portion of naphtha and compounds more volatile than naphtha are separated from the disadvantaged crude.

In some embodiments, the crude product is blended with a crude that is the same as or different from the hydrocarbon feed. For example, the crude product may be combined with a crude having a different viscosity thereby resulting in a blended product having a viscosity that is between the viscosity of the crude product and the viscosity of the crude. In another example, the crude product may be blended with crude having a TAN, viscosity and/or API gravity that is different, thereby producing a product that has a selected property that is between that selected property of the crude product and the crude. The blended product may be suitable for transportation and/or treatment. In some embodiments, disadvantaged crude is separated to form the hydrocarbon feed. The hydrocarbon feed is then contacted with one or more catalysts to change a selected property of the hydrocarbon feed to form a total product. At least a portion of the total product and/or at least a portion of a crude product from the total product may blended with at least a portion of the disadvantaged crude and/or a different crude to obtain a product having the desired properties.

In some embodiments, the crude product and/or the blended product are transported to a refinery and distilled and/or fractionally distilled to produce one or more hydrocarbon fractions. The hydrocarbon fractions may be processed to produce commercial products such as transportation fuel, lubricants, or chemicals. Blending and separating of the disadvantaged crude and/or hydrocarbon feed, total product and/or crude product is described U.S. Published Patent Application No. 20050133414 to Bhan et al.

In some embodiments, the crude product has a total molybdenum content of at most 90%, at most 50%, at most 10%, at most 5%, or at most 3% of the molybdenum content of the hydrocarbon feed. In certain embodiments, the crude product has a total molybdenum content ranging from 0.001 wtppm to 1 wtppm, from 0.005 wtppm to 0.1 wtppm, or from 0.01 to 0.05 wtppm.

In some embodiments, the crude product has a copper content of at most 90%, at most 50%, at most 10%, at most 5%, or at most 3% of the copper content of the hydrocarbon feed. In certain embodiments, the crude product has a total copper content ranging from 0.001 wtppm to 1 wtppm, from 0.005 wtppm to 0.1 wtppm, or from 0.01 to 0.05 wtppm.

In some embodiments, the crude product has a total content of metals in metal salts of organic acids of at most 90%, at most 50%, at most 10%, or at most 5% of the total content of metals in metal salts of organic acids in the hydrocarbon feed. Organic acids that generally form metal salts include, but are not limited to, carboxylic acids, thiols, imides, sulfonic acids, and sulfonates. Examples of carboxylic acids include, but are not limited to, naphthenic acids, phenanthrenic acids, and benzoic acid. The metal portion of the metal salts may include alkali metals (for example, lithium, sodium, and potassium), alkaline-earth metals (for example, magnesium, calcium, and barium), Column 12 metals (for example, zinc and cadmium), Column 15 metals (for example arsenic), Column 6 metals (for example, chromium), or mixtures thereof.

In certain embodiments, the crude product has a total content of metals in metal salts of organic acids in a range from 0.1 wtppm to 50 wtppm, 3 wtppm to 20 wtppm, or 10 wtppm to 1 wtppm.

In certain embodiments, API gravity of the crude product produced from contact of the hydrocarbon feed with catalyst, at the contacting conditions, is increased by at least 2, at least 3, at least 5, or at least 10 relative to the API gravity of the hydrocarbon feed. In certain embodiments, API gravity of the crude product ranges from 7 to 40, 10 to 30, or 12 to 25.

In certain embodiments, the crude product has a viscosity of at most 90%, at most 80%, or at most 70% of the viscosity of the hydrocarbon feed. In some embodiments, the viscosity of the crude product is at most 1000, at most 500, or at most 100 cSt.

In some embodiments, the crude product has a sediment content of at most 0.1% by weight of crude product. The sediment content of the crude product may range from 0.0001% to 0.1% from 0.001% to 0.05%, or from 0.005% to 0.01% by weight of crude product.

In some embodiments, the sulfur content of the crude product is at most 90%, at most 80%, or at most 70% of the sulfur content of the hydrocarbon feed. In some embodiments the sulfur content of the crude product is at least 0.02 grams per gram of crude product. The sulfur content of the crude product may range from 0.001 grams to 0.1 grams, from 0.005 to 0.08 grams or from 0.01 to 0.05 grams per gram of crude product.

In some embodiments, the nitrogen content of the crude product is 70% to 130%, 80% to 120%, or 90% to 110% of the nitrogen content of the hydrocarbon feed.

In some embodiments, the crude product has a nitrogen content at least 0.02 grams of nitrogen per gram of crude product. In some embodiments, the nitrogen content of the crude product may range from 0.001 grams to 0.1 grams, from 0.005 grams to 0.08 grams, or from 0.01 to 0.05 grams per gram of crude product.

In some embodiments, the crude product includes, in its molecular structures, from 0.05 grams to 0.15 grams or from 0.09 grams to 0.13 grams of hydrogen per gram of crude product. The crude product may include, in its molecular structure, from 0.8 grams to 0.9 grams or from 0.82 grams to 0.88 grams of carbon per gram of crude product. A ratio of atomic hydrogen to atomic carbon (H/C) of the crude product may be within 70% to 130%, 80% to 120%, or 90% to 110% of the atomic H/C ratio of the hydrocarbon feed. A crude product atomic H/C ratio within 10% to 30% of the hydrocarbon feed atomic H/C ratio indicates that uptake and/or consumption of hydrogen in the process is relatively small, and/or that hydrogen is produced in situ.

The crude product includes components with a range of boiling points. In some embodiments, the crude product includes, per gram of the crude product: at least 0.001 grams, or from 0.001 grams to 0.5 grams of hydrocarbons with a boiling range distribution of at most 100° C. at 0.101 MPa; at least 0.001 grams, or from 0.001 grams to 0.5 grams of hydrocarbons with a boiling range distribution between 100° C. and 200° C. at 0.101 MPa; at least 0.001 grams, or from 0.001 grams to 0.5 grams of hydrocarbons with a boiling range distribution between 200° C. and 300° C. at 0.101 MPa; at least 0.001 grams, or from 0.001 grams to 0.5 grams of hydrocarbons with a boiling range distribution between 300° C. and 400° C. at 0.101 MPa; and at least 0.001 grams, or from 0.001 grams 0.5 grams of hydrocarbons with a boiling range distribution between 400° C. and 538° C. at 0.101 MPa.

In some embodiments the crude product includes, per gram of crude product, at least 0.001 grams of hydrocarbons with a boiling range distribution of at most 100° C. at 0.101 MPa and/or at least 0.001 grams of hydrocarbons with a boiling range distribution between 100° C. and 200° C. at 0.101 MPa.

In some embodiments, the crude product has a distillate content of at least 110%, at least 120%, or at least 130% of the distillate content of the hydrocarbon feed. The distillate content of the crude product may be, per gram of crude product, in a range from 0.00001 grams to 0.6 grams (0.001-60 wt %), 0.001 grams to 0.5 grams (0.1-50 wt %), or 0.01 grams to 0.4 grams (1-40 wt %).

In certain embodiments, the crude product has a VGO content, boiling between 343° C. to 538° C. at 0.101 MPa, of 70% to 130%, 80% to 120%, or 90% to 110% of the VGO content of the hydrocarbon feed. In some embodiments, the crude product has, per gram of crude product, a VGO content in a range from 0.00001 grams to 0.8 grams, 0.001 grams to 0.7 grams, 0.01 grams to 0.6 grams, or 0.1 grams to 0.5 grams.

In some embodiments, the crude product has a residue content of at most 90%, at most 80%, or at most 50% of the residue content of the hydrocarbon feed. The crude product may have, per gram of crude product, a residue content in a range from in a range from 0.00001 grams to 0.8 grams, 0.001 grams to 0.7 grams, 0.01 grams to 0.6 grams, 0.05 grams to 0.5 grams, or 0.1 to 0.3 grams.

In some embodiments, the crude product has a total $C_5$ and $C_7$ asphaltenes content of at most 90%, at most 80%, at most 75%, or at most 50% of the total $C_5$ and $C_7$ asphaltenes content of the hydrocarbon feed. In other embodiments, the $C_5$ asphaltenes content of the hydrocarbon feed is at least 10%, at least 30%, or at least 40% of the $C_5$ asphaltenes content of the hydrocarbon feed. In certain embodiments, the crude product has, per gram of hydrocarbon feed, a total $C_5$ and $C_7$ asphaltenes content ranging from 0.001 grams to 0.2 grams, 0.01 to 0.15 grams, or 0.05 grams to 0.15 grams. In certain embodiments, the crude product has a MCR content of at most 95%, at most 90%, or at most 80% of the MCR content of the hydrocarbon feed. In some embodiments, decreasing the $C_5$ asphaltenes content of the hydrocarbon feed while maintaining a relatively stable MCR content may increase the stability of the hydrocarbon feed/total product mixture. The crude product has, in some embodiments, from 0.0001 grams to 0.20 grams, 0.005 grams to 0.15 grams, or 0.01 grams to 0.010 grams of MCR per gram of crude product.

In some embodiments, the crude product is a hydrocarbon composition that has a total Ni/Fe/V content of at least 150 wtppm; a residue content of at least 0.1 grams per gram of hydrocarbon composition; a distillate content of at least 0.1 grams per gram of hydrocarbon composition, an oxygen content of at most 0.1 grams per gram of hydrocarbon composition; a micro-carbon residue content of at least 0.05 grams per gram of hydrocarbon composition, and has a viscosity of at most 100 cSt at 37.8° C.

In some embodiments, the crude product includes from greater than 0 grams, but less than 0.01 grams, 0.000001 grams to 0.001 grams, or 0.00001 grams to 0.0001 grams of total catalyst per gram of crude product. The catalyst present in the crude product may assist in stabilizing the crude product during transportation and/or treatment. The catalyst in the crude product may inhibit corrosion, inhibit friction, and/or increase water separation abilities of the crude product. Methods described herein may be configured to add one or more catalysts described herein to the crude product during treatment.

It may be desirable to only selectively reduce one or more components (for example, residue and/or viscosity) in a hydrocarbon feed without significantly changing the amount of Ni/V/Fe and/or sulfur in the hydrocarbon feed. In this manner, hydrogen uptake during contacting may be "concentrated" on residue reduction, and not reduction of other components. Since less of such hydrogen is also being used to reduce other components in the hydrocarbon feed, the amount of hydrogen used during the process may be minimized. For example, a disadvantaged crude may have a high residue, but a Ni/V/Fe content that is acceptable to meet treatment and/or transportation specifications. Such hydrocarbon feed may be more efficiently treated by reducing residue without also reducing Ni/V/Fe.

In some embodiments, contact of a hydrocarbon feed using the catalysts described herein at temperatures and pressures described herein produces a crude product that has a viscosity of at most 100 cSt at 37.8° C., a total Ni/Fe/V content of at least 150 wtppm, a residue content of at least 0.1 grams per gram of crude product, a distillate content of at least 0.1 grams per gram of crude product, an oxygen content of at most 0.1 grams per gram of crude product, and a micro-carbon residue content of at least 0.05 grams per gram of crude product.

Catalysts used in one or more embodiments of the inventions may include one or more bulk metals and/or one or more metals on a support. The metals may be in elemental form or in the form of a compound of the metal. The catalysts described herein may be introduced into the contacting zone as a precursor, and then become active as a catalyst in the contacting zone (for example, when sulfur and/or a hydrocarbon feed containing sulfur is contacted with the precursor).

In some embodiments, catalysts used to change properties of the hydrocarbon feed include one or more Columns 6-10 metals on a support. Columns 6-10 metal(s) include, but are not limited to, chromium, molybdenum, tungsten, manganese, technetium, rhenium, iron, cobalt, nickel, ruthenium, palladium, rhodium, osmium, iridium, platinum, or mixtures thereof. The catalyst may have, per gram of catalyst, a total Columns 6-10 metal(s) content in a range from at least 0.0001 grams, at least 0.001 grams, at least 0.01 grams, or in a range of 0.0001 grams to 0.6 grams, 0.001 grams to 0.3 grams, 0.005 grams to 0.1 grams, or 0.01 grams to 0.08 grams.

In some embodiments, the catalyst includes Column 15 element(s) in addition to the Columns 6-10 metal(s). Examples of Column 15 elements include phosphorus. The catalyst may have a total Column 15 element content, per gram of catalyst, in range from 0.000001 grams to 0.1 grams, 0.00001 grams to 0.06 grams, 0.00005 grams to 0.03 grams, or 0.0001 grams to 0.001 grams.

In certain embodiments, the catalyst includes Column 6 metal(s). Column 6 metal(s) include, but are not limited to, chromium, molybdenum, tungsten, or mixtures thereof. The catalyst may have, per gram of catalyst, a total Column 6 metal(s) content of at least 0.00001 grams, at least 0.01 grams, at least 0.02 grams and/or in a range from 0.0001 grams to 0.6 grams, 0.001 grams to 0.3 grams, 0.005 grams to 0.1 grams, or 0.01 grams to 0.08 grams. In some embodiments, the catalyst includes from 0.0001 grams to 0.06 grams of Column 6 metal(s) per gram of catalyst. In some embodiments, compounds of Column 6 metal(s) include oxides such as molybdenum trioxide and/or tungsten trioxide. In certain embodiments, the catalyst includes only Column 6 metals or only Column 6 compounds. In an embodiment, the catalyst includes only molybdenum and/or molybdenum oxides. In one embodiment the Column 6-10 metal catalyst comprises at least 0.1 grams of molybdenum per gram of catalyst.

In some embodiments, the catalyst includes a combination of Column 6 metal(s) with one or more metals from Columns 7-10. Columns 7-10 metal(s) include, but are not limited to, manganese, technetium, rhenium, iron, cobalt, nickel, ruthenium, palladium, rhodium, osmium, iridium, platinum, or mixtures thereofIn some embodiments, the catalyst has at most 0.03 grams, at most 0.02 grams or 0.01 grams of Columns 7-10 metals per gram of catalyst. In some embodiments, the catalyst does not include Columns 7-10 metals.

A molar ratio of Column 6 metal to Columns 7-10 metal may be in a range from 0.1 to 20, 1 to 10, or 2 to 5. In other embodiments, the catalyst includes Column 6 metal(s) and Column 10 metal(s). A molar ratio of the total Column 10 metal to the total Column 6 metal in the catalyst may be in a range from 1 to 10, or from 2 to 5.

Columns 6-10 metal(s) are incorporated with a support to form the catalyst. In certain embodiments, Columns 6-10 metal(s) in combination with Column 15 element(s) are incorporated with a support to form the catalyst. In embodiments in which the metal(s) and/or element(s) are supported, the weight of the catalyst includes all support, all metal(s), and all element(s). In some embodiments, the support includes refractory oxides, porous carbon based materials, zeolites, or combinations thereof. Refractory oxides may include, but are not limited to, alumina, silica, silica-alumina, titanium oxide, zirconium oxide, magnesium oxide, or mixtures thereof. Supports may be obtained from a commercial manufacturer such as Criterion Catalysts and Technologies LP (Houston, Tex., U.S.A.). Porous carbon based materials include, but are not limited to, activated carbon and/or porous graphite. Examples of zeolites include Y-zeolites, beta zeolites, mordenite zeolites, ZSM-5 zeolites, and ferrierite zeolites. Zeolites may be obtained from a commercial manufacturer such as Zeolyst (Valley Forge, Pa., U.S.A.).

In certain embodiments, the support includes gamma alumina, delta alumina, alpha alumina, or combinations thereof. The amount of gamma alumina, delta alumina, alpha alumina, or combinations thereof, per gram of catalyst support, may be in a range from 0.0001 grams to 0.99 grams, 0.001 grams to 0.5 grams, 0.01 grams to 0.1 grams, or at most 0.1 grams as determined by x-ray diffraction. In some embodiments, the support includes from 0.0001 grams to 0.10 grams, 0.001 grams to 0.05 grams, or 0.01 grams to 0.03 grams of silica; and 0.90 grams to 0.9999 grams, 0.95 grams to 0.999 grams, or 0.99 to 0.97 grams of alumina.

One or more metals from Columns 6-10 of the Periodic Table and/or one or more compounds of one or more metals from Columns 6-10 of the Periodic Table may be co-mulled with a support to form a mixture. The mixture may be formed into particles.

Catalysts that have a large surface area with a minimal amount of catalytic metal (for example, Columns 6-10 metals) on the surface of the catalyst may be prepared by comulling the catalytic metals with a support. Comulling of the support and catalytic metal may form a substantially uniform or homogeneous mixture. In some embodiments, water and/or solvent may be added to facilitate forming the mixture into a paste that may be extruded or formed into extrudate particles, spheroids, pills, tablets, cylinders, irregular extrusions or loosely bound aggregates or clusters, by any known extrusion, molding tableting, pressing, pelletizing, or tumbling methods.

The Columns 6-10 metal(s) and support may be comulled with suitable mixing equipment. If more than one metal is present the metals may be added together or separately. Examples of suitable mixing equipment include tumblers, stationary shells or troughs, Muller mixers (for example, batch type or continuous type), impact mixers, and any other generally known mixer, or generally known device, that will suitably provide the Columns 6-10 metal(s)/support mixture. In certain embodiments, the materials are mixed until the Columns 6-10 metal(s) is (are) substantially homogeneously dispersed in the support. Dispersion of the Columns 6-10 metal(s) in the support may inhibit coking of the Columns 6-10 metal(s) at high temperatures and/or pressures, thus allowing hydrocarbon feeds containing significant amounts of residue and/or high viscosities to be processed at rates, temperatures and pressures not obtainable by using conventional catalysts made using impregnation techniques. In some embodiments, comulling of a support containing silica and Column 6-10 metal(s) forms a smoother catalyst surface.

Co-mulling the Column 6 metal(s) alone or in combination with Columns 7-10 metal(s) with the support allows (in contrast to impregnation of a support) at least a portion of the metal(s) to reside under the surface of the embedded metal catalyst (for example, embedded in the support), leading to less metal on the surface than would otherwise occur in the unembedded metal catalyst. In some embodiments, having less metal on the surface of the catalyst extends the life and/or catalytic activity of the catalyst by allowing at least a portion of the metal to move to the surface of the catalyst during use. The metals may move to the surface of the catalyst through erosion of the surface of the catalyst during contact of the catalyst with a hydrocarbon feed.

Without wishing to be bound by any kind of theory, intercalation and/or mixing of the components of the catalysts may change the structured order of the Column 6-10 metal in the Column 6-10 metal oxide crystal structure to a substantially random order of Column 6-10 metal in the crystal structure of the embedded catalyst. The order of the Column 6-10 metal may be determined using powder x-ray diffraction methods. The order of elemental metal in the catalyst relative to the order of elemental metal in the metal oxide may be determined by comparing the order of the Column 6-10 metal peak in an x-ray diffraction spectrum of the Column 6-10 metal oxide to the order of the Column 6-10 metal peak in an x-ray diffraction spectrum of the catalyst. From broadening and/or absence of patterns associated with Column 6-10 metal in an x-ray diffraction spectrum, it is possible to estimate that the Column 6-10 metal(s) are substantially randomly ordered in the crystal structure. For example, molybdenum trioxide and the alumina support having a median pore diameter of at least 180 Å may be combined to form an alumina/molybdenum trioxide mixture. Molybdenum trioxide has a definite pattern (for example, definite $D_{001}$, $D_{002}$ and/or $D_{003}$ peaks). The alumina/molybdenum trioxide mixture may be heat treated at a temperature of at least 316° C. (600° F.), at least 427° C. (800° F.), or at least 538° C. (1000° F.) to produce a catalyst that does not exhibit a pattern for molybdenum trioxide in an x-ray diffraction spectrum (for example, an absence of the $D_{001}$ peak).

Co-mulling the Columns 6-10 metal(s) with the support forms a Columns 6-10 metal(s)/support mixture. In some embodiments, an acid and/or water is added to the Columns 6-10 metal(s)/support mixture to assist in formation of the mixture into particles. The water and/or dilute acid are added in such amounts, and by such methods, as required to give the mixture a desired consistency suitable to be formed into particles. Examples of acids include, but are not limited to, nitric acid, acetic acid, sulfuric acid, and hydrochloric acid.

The Columns 6-10 metal(s)/support mixture may be formed into particles using known techniques in the art such as extrusion. The particles (extrudates) may be cut using known catalyst cutting methods to form particles. The particles may be heat treated (dried) at a temperature in a range from 65° C. to 260° C. or from 85° C. to 235° C. for a period of time (for example, for 0.5-8 hours or 1-5 hours) and/or until the moisture content of the particle has reached a desired level.

The Column 6-10 metal/support and/or the Column 6-10 metal/support particles may be calcined in the presence of hot air and/or oxygen rich air at a temperature in a range between 315° C. and 760° C., between 535° C. and 700° C., or between 500° C. and 680° C. for a period of time (for example 0.5-8 hours or 1 to 5 hours) to remove volatile matter such that at least a portion of the Columns 6-10 metals are converted to the corresponding metal oxide. The temperature conditions at which the particles are calcined may be such that the pore structure of the final calcined mixture is controlled to form the pore structure and surface areas of the catalysts described herein. Calcining at temperatures greater than 760° C. may increase the pore volume of the catalyst, thus change the distribution of pores and the surface area such that the catalyst is not as effective in removing compounds that contribute to high viscosity and/or residue.

Contact of a hydrocarbon feed having undesirable properties (for example, an undesirable viscosity, API gravity, MCR content, asphaltene content, metals content and/or residue content) with a Columns 6-10 metal(s) catalysts having stacked structures (for example, catalysts formed using impregnation techniques) may require elevated temperatures and/or pressures to produce a crude product with selected properties. The elevated temperatures or pressures allow minimal contact of the catalyst with hydrocarbon feed so that the catalyst does not become deactivated. Contact of the catalyst with feeds having high residue contents may shorten catalyst life due to the high molecular weight compounds and/or metals in the hydrocarbon feed plugging the pores of the catalyst.

In contrast, contact of the feed with a catalyst with dispersed metal clusters (for example, a catalyst formed by comulling) that form a desired surface topology for the catalyst as described herein may allow advantageous changes to the feed to occur at higher temperatures and/or lower pressures. This desired topology may allow the hydrocarbon feed to contact the surface of the catalyst for longer periods of time without deleterious effects to the active metal sites of the catalyst, thus the dispersed metal cluster catalyst may have a longer life than the conventional hydroprocessing catalyst at elevated temperatures and lower pressures (for example, temperatures of at least 400° C. and pressures of 3.8 MPa, 5 MPa, or 7 MPa). The selected topology catalyst may allow a process to be run without recharging or changing the catalyst, thus cost of processing the hydrocarbon feed may be economically advantageous.

In some embodiments, catalysts may be characterized by pore structure. Various pore structure parameters include, but are not limited to, pore diameter, pore volume, surface areas, or combinations thereof. The catalyst may have a distribution of total quantity of pore sizes versus pore diameters. The median pore diameter of the pore size distribution of the catalyst of the present invention may be in a range from 105 Å to 150 Å, 110 Å to 130 Å, or 110 Å to 120 Å. In some embodiments, the catalyst has a pore size distribution with a median pore diameter in a range from 105 Å to 150 Å, 110 Å to 130 Å, or 110 Å to 120 Å, with at least 60% of a total number of pores in the pore size distribution having a pore diameter within 60 Å, 45 Å, 35 Å, or 25 Å of the median pore diameter.

In some embodiments, the pore volume in pores of the catalyst of the present invention may be at least 0.3 cm$^3$/g, at least 0.7 cm$^3$/g, or at least 0.9 cm$^3$/g. In certain embodiments, the pore volume in pores of the catalyst of the present invention may range from 0.3 cm$^3$/g to 0.99 cm$^3$/g, 0.4 cm$^3$/g to 0.8 cm$^3$/g, or 0.5 cm$^3$/g to 0.7 cm$^3$/g.

The pore volume of the catalyst includes pores having a pore diameter between 1 Å and 5000 Å and pores having a pore diameter greater than 5000 Å. In some embodiments, the catalyst has a majority of its pore volume in pores having a pore diameter of at most 600 Å, at most 500 Å, at most 300 Å, or at most 200 Å.

In some embodiments, the catalyst may have a pore size distribution with a median pore diameter in a range from about 105 Å to 150 Å, with at least 60% of the total number of pores in the pore size distribution having a pore diameter within 60 Å of the median pore diameter, with at least 50% of its pore volume in pores having a pore diameter of at most 600 Å, and between 5% and 25% of its pore volume in pores having a pore diameter between 1000 Å and 5000 Å.

In some embodiments the catalyst has at most 10%, at most 5% or at most 4% of its pore volume in pores of at least 5000 Å.

The catalyst of the present invention may have a surface area of at least 200 m$^2$/g. Such surface area may be in a range from 250 m$^2$/g to 500 m$^2$/g, or 260 m$^2$/g to 400 m$^2$/g.

Catalysts having specific surface topology, large surface areas and pore distributions described above may exhibit enhanced run times in commercial applications at low pressures and elevated temperatures. For example, the catalyst may remain catalytically active after at least 1 year of run time. The enhanced run times may be attributed to the high surface area of the catalyst and/or the narrow distribution of pore diameter in the pore volume of the catalyst. Thus, the metals of the catalyst remain exposed for longer periods of time and plugging of the pores of the catalyst is minimal. The high surface area and selected distribution of pores in the pore volume of the catalyst allows processing of high viscosity and/or high residue crudes that would not be able to be processed with conventional catalysts having the same pore distribution, but smaller surface area. Calcining a comulled catalyst at temperatures ranging from 315° C. to 760° C. may facilitate formation of pores having similar pore diameters and narrow pore distributions with large surface areas.

In certain embodiments, the catalyst exists in shaped forms, for example, pellets, cylinders, and/or extrudates. In some embodiments, the catalyst and/or the catalyst precursor is sulfided to form metal sulfides (prior to use) using techniques known in the art (for example, ACTICAT™ process, CRI International, Inc.). In some embodiments, the catalyst may be dried then sulfided. Alternatively, the catalyst may be sulfided in situ by contact of the catalyst with a hydrocarbon feed that includes sulfur-containing compounds. In-situ sulfurization may utilize either gaseous hydrogen sulfide in the presence of hydrogen, or liquid-phase sulfurizing agents such as organosulfur compounds (including alkylsulfides, polysulfides, thiols, and sulfoxides). Ex-situ sulfurization processes are described in U.S. Pat. No. 5,468,372 to Seamans et al., and U.S. Pat. No. 5,688,736 to Seamans et al., all of which are incorporated herein by reference.

In certain embodiments, the catalyst is obtainable by co-mulling Column 6-10 metal(s) with a support. Co-mulling the Column 6 metal(s) with the support may form a mixture or a substantially homogeneous mixture. In some embodiments, the mixture may be extruded and/or dried. The mixture may be calcined at a temperature of between 315° C. and 700° C. to produce the catalyst.

The support may include alumina, silica, alumina-silica, titanium oxide, zirconium oxide, magnesium oxide, or mixtures thereof.

The catalyst may have from 0.001 grams to 0.3 grams, 0.005 grams to 0.2 grams, or 0.01 grams to 0.1 grams of Column 6-10 metal(s) per gram of catalyst. In some embodiments, the catalyst may include at least 0.1 grams of Column 6 metal(s) per gram of catalyst. In some embodiments, the catalyst may include at least 0.05 grams to 0.2 grams of Column 6 metal(s) per gram of catalyst. In some embodiments, the catalyst may include from 0.001 grams to 0.1 grams, 0.005 to 0.05 grams, or from 0.01 grams to 0.03 grams of Column 10 metal(s) per gram of catalyst. In certain embodiments, the catalyst may include from 0.001 grams to 0.1 grams, 0.005 to 0.05 grams, or from 0.01 grams to 0.03 grams of Column 9 metal(s) per gram of catalyst.

Such comulling of metal and support, followed by calcination, may produce a bimodal catalyst having a pore size distribution with a median pore diameter ranging from 105 Å to 150 Å with at least 45% or at least 60% of the total number of pores in the pore size distribution having a pore diameter within at least 60 Å of the median pore diameter, with at least 50% of its pore volume in pores having a pore diameter of at most 600 Å, and between 5% and 25% of its pore volume in pores having a pore diameter between 1000 Å and 5000 Å.

In some embodiments, the catalyst may have a median pore diameter from 110 Å and 130 Å.

In some embodiments, the catalyst may have a median pore diameter of at most 120 Å, with at least 60% of a total number of pores in the pore size distribution having a pore diameter within 60 Å, with at least 50% of its pore volume in pores having a pore diameter from 105 Å to 150 Å, between 5% and 25% of its pore volume in pores having a pore diameter between 1000 Å and 5000 Å.

The catalyst may have a surface area of from 250 $m^2/g$ to about 300 $m^2/g$ and a pore volume about 0.7 cc/g.

This catalyst may reduce at least a portion of the components that contribute to higher viscosities, a portion of the components that contribute to residue, and/or a portion of the oxygen-containing compounds. Treatment of the hydrocarbon feed with a bimodal Columns 6-10 metal catalyst with a selected pore distribution may be economical advantageous since it allows production of a product with reduced viscosity with low hydrogen consumption.

The catalyst of the application may produce a crude product with a lower viscosity as compared to the hydrocarbon feed with low hydrogen consumption. In some embodiments, at contacting conditions at a total pressure of 3.5 MPa, hydrogen consumption may be at most 60 $Nm^3/m^3$, at most 50 $Nm^3/m^3$, or at most 30 $Nm^3/m^3$. In some embodiments, at contacting conditions at a total pressure of 3.5 MPa, hydrogen consumption may be from 1 $Nm^3/m^3$ to 60 $Nm^3/m^3$, from 1 $Nm^3/m^3$ to 50 $Nm^3/m^3$, or from 5 $Nm^3/m^3$ to 30 $Nm^3/m^3$.

Using the catalyst(s) of this application and controlling operating conditions may allow a crude product to be produced that has selected properties changed relative to the hydrocarbon feed while other properties of the hydrocarbon feed are not significantly changed. The resulting crude product may have enhanced properties relative to the hydrocarbon feed and, thus, be more acceptable for transportation and/or refining.

Arrangement of two or more catalysts in a selected sequence may control the sequence of property improvements for the feed. For example, API gravity, at least a portion of the $C_5$ asphaltenes, at least a portion of metals in metal salts of organic acids, at least a portion of the iron, at least a portion of the nickel, and/or at least a portion of the vanadium or molybdenum in the hydrocarbon feed can be reduced before at least a portion of heteroatoms in the feed are reduced.

Arrangement and/or selection of the catalysts may, in some embodiments, improve lives of the catalysts and/or the stability of the hydrocarbon feed/total product mixture. Improvement of a catalyst life and/or stability of the hydrocarbon feed/total product mixture during processing may allow a contacting system to operate for at least 3 months, at least 6 months, or at least 1 year without replacement of the catalyst in the contacting zone.

Combinations of selected catalysts may allow reduction in at least a portion of the components that contribute to viscosity, at least a portion of the components that contribute to residue, at least a portion of the components that contribute to TAN, or combinations thereof, from the hydrocarbon feed before other properties of the hydrocarbon feed are changed, while maintaining the stability of the hydrocarbon feed/total product mixture during processing (for example, maintaining a hydrocarbon feed P-value of above 1.5). Alternatively, $C_5$ asphaltenes, and/or API gravity may be incrementally reduced by contact of the hydrocarbon feed with selected catalysts. The ability to incrementally and/or selectively change properties of the hydrocarbon feed may allow the stability of the hydrocarbon feed/total product mixture to be maintained during processing.

In some embodiments, the catalyst (described above) may be positioned upstream of a series of catalysts. Such positioning of the catalyst may allow removal of high molecular weight contaminants, and/or metals in metal salts of organic acids, while maintaining the stability of the hydrocarbon feed/total product mixture.

The catalyst allows, in some embodiments, for removal of at least a portion of oxygen-containing compounds, removal of components that contribute to a decrease in the life of other catalysts in the system, or combinations thereof, from the hydrocarbon feed. For example, reducing at least a portion of $C_5$ asphaltenes in the hydrocarbon feed/total product mixture relative to the hydrocarbon feed inhibits plugging of other catalysts positioned downstream, and thus, increases the length of time the contacting system may be operated without replenishment of catalyst. Reduction in viscosity may, in some embodiments, increase a life of one or more catalysts positioned after the catalyst described above.

In some embodiments, commercially available catalysts may be positioned downstream and/or upstream of the catalyst described herein to reduce selected properties of the feed. For example, a demetallization catalyst may be positioned downstream and/or upstream of the catalyst to reduce the Ni/V/Fe content of the crude produce as compared to Ni/V/Fe of the feed. A desulfurization catalyst may be positioned downstream of the catalyst to reduce the sulfur-containing compounds content of the crude product as compared to the sulfur-containing compounds content of the feed.

The ability to deliver hydrogen to specified contacting zones tends to minimize hydrogen usage during contacting. Combinations of catalyst(s) that facilitate generation of hydrogen during contacting, and catalysts that uptake a relatively low amount of hydrogen during contacting, may be used to change selected properties of a crude product relative to the same properties of the hydrocarbon feed. The order and/or number of catalyst(s) may be selected to minimize net hydrogen uptake while maintaining the hydrocarbon feed/total product stability. Minimal net hydrogen uptake allows residue content, VGO content, distillate content, API gravity, or combinations thereof of the hydrocarbon feed to be maintained within 20% of the respective properties of the hydrocarbon feed, while the API gravity and/or the viscosity of the crude product is at most 90% of the API gravity and/or the viscosity of the hydrocarbon feed.

Reduction in net hydrogen uptake by the hydrocarbon feed may produce a crude product that has a boiling range distribution similar to the boiling point distribution of the hydrocarbon feed. The atomic H/C ratio of the crude product may also only change by relatively small amounts as compared to the atomic H/C ratio of the hydrocarbon feed.

In some embodiments, catalyst selection and/or order of catalysts in combination with controlled contacting conditions (for example, temperature and/or hydrocarbon feed flow rate) may assist in reducing hydrogen uptake by the hydrocarbon feed, maintaining hydrocarbon feed/total product mixture stability during processing, and changing one or more properties of the crude product relative to the respective properties of the hydrocarbon feed. Stability of the hydrocarbon feed/total product mixture may be affected by various phases separating from the hydrocarbon feed/total product mixture. Phase separation may be caused by, for example, insolubility of the hydrocarbon feed and/or crude product in the hydrocarbon feed/total product mixture, flocculation of asphaltenes from the hydrocarbon feed/total product mixture, precipitation of components from the hydrocarbon feed/total product mixture, or combinations thereof.

At certain times during the contacting period, the concentration of hydrocarbon feed and/or total product in the hydrocarbon feed/total product mixture may change. As the concentration of the total product in the hydrocarbon feed/total product mixture changes due to formation of the crude product, solubility of the components of the hydrocarbon feed and/or components of the total product in the hydrocarbon feed/total product mixture tends to change. For example, the hydrocarbon feed may contain components that are soluble in the hydrocarbon feed at the beginning of processing. As properties of the hydrocarbon feed change (for example, API gravity, viscosity, MCR, $C_5$ asphaltenes, P-value, sediment, or combinations thereof), the components may tend to become less soluble in the hydrocarbon feed/total product mixture. In some instances, the hydrocarbon feed and the total product may form two phases and/or become insoluble in one another. Solubility changes may also result in the hydrocarbon feed/total product mixture forming two or more phases. Formation of two phases, through flocculation of asphaltenes, change in concentration of hydrocarbon feed and total product, and/or precipitation of components, tends to reduce the life of one or more of the catalysts. Additionally, the efficiency of the process may be reduced. For example, repeated treatment of the hydrocarbon feed/total product mixture may be necessary to produce a crude product with desired properties.

During processing, the P-value and/or sediment value of the hydrocarbon feed/total product mixture may be monitored and the stability of the process, hydrocarbon feed, and/or hydrocarbon feed/total product mixture may be assessed. Typically, a P-value that is at most 1.0 indicates that flocculation of asphaltenes from the hydrocarbon feed generally occurs. If the P-value is initially at least 1.0, and such P-value increases or is relatively stable during contacting, then this indicates that the hydrocarbon feed is relatively stabile during contacting. Hydrocarbon feed/total product mixture stability, as assessed by P-value, may be controlled by controlling contacting conditions, by selection of catalysts, by selective ordering of catalysts, or combinations thereof. Such controlling of contacting conditions may include controlling LHSV, temperature, pressure, hydrogen uptake, hydrocarbon feed flow, or combinations thereof.

Monitoring a sediment value during processing may indicate formation of high molecular compounds, precipitation of high molecular compounds, or precipitation of metals. A sediment value that decreases or is relatively stable during contacting indicates that the hydrocarbon feed is relatively stable during contacting.

During processing, the inlet pressure of a contacting zone of a fixed bed reactor may be monitored. A rapid increase in inlet pressure may indicate that flow through the catalyst is inhibited. The inhibition of flow may be caused by an increase in deposit or sediment formation. The increase in deposit or sediment may plug pores of the catalyst, thus restricting flow of the hydrocarbon feed through the contacting zone.

Typically, hydrocarbon feed having viscosities that inhibit the hydrocarbon feed from being transported and/or pumped are contacted with a catalyst at elevated hydrogen pressures (for example, at least 7 MPa, at least 10 MPa or at least 15 MPa) to produce products that are more fluid. At elevated hydrogen pressures coke formation is inhibited, thus the properties of the hydrocarbon feed may be changed with minimal coke production. Since reduction of viscosity, residue and $C_5/C_7$ asphaltenes is not dependent on hydrogen pressure reduction of these properties may not occur unless the contacting temperature is at least 300° C. For some hydrocarbon feeds, temperatures of at least 350° C. may be required to reduce desired properties of the hydrocarbon feed to produce a product that meets the desired specifications. At increased temperatures coke formation may occur, even at elevated hydrogen pressures. As the properties of the hydrocarbon feed are changed, the P-value of the hydrocarbon feed/total product may decrease below 1.0 and/or sediment may form, causing the product mixture to become unstable. Since, elevated hydrogen pressures require large amounts of hydrogen, a process capable of reducing properties that are independent of pressure at minimal temperatures is desirable.

Contact of a hydrocarbon feed having a viscosity of at least 10 cSt at 37.8° C. (for example, at least 100 cSt, at least 1000 cSt, or at least 2000 cSt) in a controlled temperature range of 370° C. to 450° C., 390° C. to 440° C., or from 400° C. to 430° C. at pressures of 3.5 MPa, 5 MPa, or 7 MPa with the catalyst described herein produces a crude product having changed properties (for example, viscosity, residue and $C_5/C_7$ asphaltenes) of at most 50%, at most 30%, at most 20%, at most 10%, or at most 1% of the respective property of the hydrocarbon feed. During contact, the P-value remains may be kept above 1.0 by controlling the contacting temperature. For example, in some embodiments, if the temperature increases above 450° C., the P-value drops below 1.0 and the hydrocarbon feed/total product mixture becomes unstable. If the temperature decreases below 370° C., minimal changes to the hydrocarbon feed properties occur.

In some embodiments, contacting temperatures are controlled such that $C_5$ asphaltenes and/or other asphaltenes are removed while maintaining the MCR content of the hydrocarbon feed. Reduction of the MCR content through hydrogen uptake and/or higher contacting temperatures may result in formation of two phases that may reduce the stability of the hydrocarbon feed/total product mixture and/or life of one or more of the catalysts. Control of contacting temperature and hydrogen uptake in combination with the catalysts described herein allows the $C_5$ asphaltenes to be reduced while the MCR content of the hydrocarbon feed only changes by a relatively small amount.

In some embodiments, contacting conditions are controlled such that the total partial pressure of the contacting zone is maintained at a desired pressure, at a set flow rate and elevated temperatures (for example, temperatures of at least 200° C., at least 300° C., or at least 400° C.). The ability to operate at a total pressure of at most 5 MPa or at most 3.5 MPa allows an increase in LHSV (for example an increase to at least 0.5 $h^{-1}$, at least 1 $h^{-1}$, at least 2 $h^{-1}$, at least 5 $h^{-1}$, or at least 10 $h^{-1}$) with the same or longer catalyst life as contacting at total pressures of at most 5 MPa or at most 3.5 MPa. Operating at lower partial pressures of hydrogen or lower total pressure decreases the cost of the operation and allows contacting to be performed where limited amounts of hydrogen are available. In some embodiments, the total pressure is the same as the total partial pressure of hydrogen being fed to the contacting zone.

The crude product produced by contacting a hydrocarbon feed with one or more catalysts described herein may be useful in a wide range of applications including, but not limited to, use a feed to refineries, feed for producing transportation fuel, a diluent, or an enhancing agent for underground oil recovery processes. For example, hydrocarbon feeds having an API gravity of at most 10 (for example, bitumen and/or heavy oil/tar sands crude) may be converted into various hydrocarbon streams through a series of processing steps using cracking units (for example, an ebullating bed cracking unit, a fluid catalytic cracking unit, thermal cracking unit, or other units known to convert hydrocarbon feed to lighter components).

Reduction of the viscosity and/or residue content of a hydrocarbon feed to produce a feed stream that may be processed in a cracking unit may enhance the processing rate of hydrocarbon feed. A system using the methods and catalysts described herein to change properties of a hydrocarbon feed may be positioned upstream of one or more cracking units. Treatment of the hydrocarbon feed in one or more systems described herein may produce a feed that improves the processing rate of the cracking unit by at least a factor of 2, at least a factor of 4, at least a factor of 10, or at least a factor of 100. For example, a system for treating a hydrocarbon feed having a viscosity of at least 100 cSt at 37.8° C. and/or 0.1 grams of residue per gram of hydrocarbon feed may include one or more contacting systems described herein positioned upstream of a cracking unit. The contacting system may include one or more catalysts described herein capable of producing a crude product having a viscosity of at most 50% of the viscosity of the hydrocarbon feed at 37.8° C. and/or at most 90% of the residue of the hydrocarbon feed. The crude product and/or a mixture of the crude product and hydrocarbon feed may enter a cracking unit. Since the crude product and/or mixture of the crude product and hydrocarbon feed has a lower viscosity than the original hydrocarbon feed, the processing rate through the cracking unit may be improved.

In some embodiments, hydrocarbon feeds having at least 0.01 grams of $C_5$ asphaltenes may be deasphalted prior to hydroprocessing treatment in a refinery operation. Deasphalting processes may involve solvent extraction and/or contacting the crude with a catalyst to remove asphaltenes. Reduction of at least a portion of the components that contribute to viscosity, at least a portion of the components that contribute to residue and/or asphaltenes prior to the deasphalting process may eliminate the need for solvent extraction, reduce the amount of required solvent, and/or enhance the efficiency of the deasphalting process. For example, a system for treating a hydrocarbon feed having, per gram of hydrocarbon feed, at least 0.01 grams of $C_5$ asphaltenes and/or 0.1 grams of residue and a viscosity of at least 10 cSt at 37.8° C. may include one or more contacting systems described herein positioned upstream of an deasphalting unit. The contacting system may include one or more catalysts described herein capable of producing a crude product having a $C_5$ asphaltenes content of at most 50% of the hydrocarbon feed $C_5$ asphaltenes content, a residue content of at most 90% of the hydrocarbon feed residue content, a viscosity of at most 50% of the hydrocarbon viscosity or combinations thereof. The crude product and/or a mixture of the crude product and hydrocarbon feed may enter the deasphalting unit. Since the crude product and/or mixture of the crude product and the hydrocarbon feed has a lower asphaltene, residue and/or viscosity than the original hydrocarbon feed, the processing efficiency of the deasphalting unit may be increased by at least 5%, at least 10%, at least 20% or at least 50% of the original efficiency.

EXAMPLES

Non-limiting examples of catalyst preparations and methods of using such catalysts under controlled contacting conditions are set forth below.

Example 1

Preparation of a Columns 6-10 Metal(s) Catalyst

A first solution was prepared by combining $MoO_3$ (789.96 grams), phosphoric acid (73.66 grams, 85.9 Mol %), and deionized water (2400 grams) to form a slurry. The slurry was heated to 82° C. until dissolution of the solids.

To the slurry, $Ni(OH)_2 \cdot (210.32$ grams) was added at a rate to control any observed exotherm, and then heated to 96° C. until dissolution of the solids. To the heated mixture was added citric acid monohydrate (5 Mol %, 200.46 grams) at a rate sufficient to control any observed exotherm. After addition of the citric acid the solution was heated to 100° C. until the molybdenum/nickel/phosphorus solution was transparent, and then the volume of the molybdenum/nickel/phosphorus solution was reduced to 1249.80 grams.

To a muller, a support (4076.09 grams) that contained 0.02 grams of silica and 0.98 grams alumina per gram of support was added. With the muller running, the molybdenum/nickel/phosphorus solution (1249.80 grams) was added to the support and the resulting mixture was mulled for 25 minutes. Deionized water (211.90 grams) was added to the molybdenum/nickel/phosphorus/support mixture and the resulting mixture was mulled 15 minutes. Additional deionized water (109.69 grams) was added to the mixture and the resulting mixture was mulled 20 minutes. The mulled molybdenum/nickel/phosphorus/support mixture had a pH of 5.05 and a loss on ignition (measured after 1 hour at 700° C.) of 0.5689 grams per gram of mixture.

The mulled mixture was extruded using 1.3 mm trilobe dies to form 1.3 mm trilobe extrudate particles. The extrudate particles were dried at 125° C. for several hours and then calcined at 676.7° C. (1250° F.) for two hours. The catalyst contained 0.133 grams of molybdenum, 0.032 grams of nickel and 0.005 grams of phosphorus with the balance being support. The catalyst had a pore size distribution with a median pore diameter of 117 Å with 60% of the total number of pores in the pore size distribution having a pore diameter within 59 Å of the median pore diameter, a total pore volume of 0.69 cc/g, a surface area of 277 m²/g. The pore size distribution measured using mercury porosimetry at a contact angle of 140 is shown in TABLE 1.

TABLE 1

| Pore Diameter in Å | % Pore Volume |
| --- | --- |
| <70 | 6.24 |
| 70-100 | 26.43 |
| 100-130 | 25.35 |
| 130-150 | 6.34 |
| 150-180 | 4.73 |
| 180-200 | 1.86 |
| 200-240 | 2.41 |
| 240-600 | 7.15 |
| 600-1000 | 2.6 |
| 1000-3000 | 7.2 |
| 3000-5000 | 6.7 |
| >5000 | 3.17 |

This example demonstrates a catalyst that includes a support and one or more metals from Columns 6-10 of the Periodic Table and/or one or more compounds of one or more metals from Columns 6-10 of the Periodic Table. The catalyst has a surface area of at least 250 m²/g, a median pore diameter ranging from 105 Å to 150 Å with at least 60% of the total number of pores in the pore size distribution having a pore diameter within at least 60 Å of the median pore diameter, with at least 50% of its pore volume in pores having a pore diameter of at most 600 Å, and between 5% and 25% of its pore volume in pores having a pore diameter between 1000 Å and 5000 Å.

Example 2

Contact of a Hydrocarbon Feed with a Column 6 Metal(s) Catalyst

A tubular reactor with a centrally positioned thermowell was equipped with thermocouples to measure temperatures throughout a catalyst bed. The catalyst bed was formed by filling the space between the thermowell and an inner wall of the reactor with catalysts and silicon carbide (20-grid, Stanford Materials; Aliso Viejo, Calif.). Such silicon carbide is believed to have low, if any, catalytic properties under the process conditions described herein. The catalyst was blended with an equal volume amount of silicon carbide before placing the mixture into the contacting zone of the reactor.

The hydrocarbon feed flow to the reactor was from the top of the reactor to the bottom of the reactor. Silicon carbide was positioned at the bottom of the reactor to serve as a bottom support.

A Column 6 metal catalyst prepared as described in Example 1 was mixed with silicone carbide (total of 50 cm$^3$) was positioned in the contacting zone.

Silicon carbide was positioned on top of the top contacting zone to fill dead space and to serve as a preheat zone. The catalyst bed was loaded into a Lindberg furnace that included four heating zones corresponding to the preheat zone, the contacting zone, and the bottom support.

The catalyst was sulfided by introducing a gaseous mixture of 5 vol % hydrogen sulfide and 95 vol % hydrogen gas into the contacting zones at a rate of 1.5 liter of gaseous mixture per volume (mL) of total catalyst (silicon carbide was not counted as part of the volume of catalyst). Temperatures of the contacting zones were increased to 204° C. (400° F.) over 1 hour and held at 204° C. for 2 hours. After holding at 204° C., the contacting zones were increased incrementally to 316° C. (600° F.) at a rate of 10° C. (50° F.) per hour. The contacting zones were maintained at 316° C. for an hour, then incrementally raised to 370° C. (700° F.) over 1 hour and held at 370° C. for two hours. The contacting zones were allowed to cool to ambient temperature.

After sulfidation of the catalysts, the temperature of the contacting zones was raised to a temperature of 410° C. A hydrocarbon feed (Peace River) having the properties listed in Table 2 was then contacted with the catalysts. The hydrocarbon feed flowed through the preheat zone, top contacting zone, bottom contacting zone, and bottom support of the reactor. The hydrocarbon feed was contacted with each of the catalysts in the presence of hydrogen gas. Contacting conditions were as follows: ratio of hydrogen gas to feed was 318 Nm$^3$/m$^3$ (2000 SCFB) and LHSV was about 0.5 h$^{-1}$. The two contacting zones were heated to 400° C. and maintained between 400° C. and 420° C. at a pressure of 3.5 MPa (500 psig) for 3436 hours as the hydrocarbon feed flowed through the reactor.

As shown in Table 2, the crude product had a viscosity of 58 cSt at 37.8° C.

This example demonstrates that contact of a hydrocarbon feed with a catalyst that includes one or more metals from Columns 6 of the Periodic Table and/or one or more compounds of one or more metals from Columns 6 of the Periodic Table having a pore size distribution with a median pore diameter in the range from 105 to 150 Å, with at least 50% of its pore volume in pores having a pore diameter of at most 130 Å, and between 10% and 20% of its pore volume in pores having a pore diameter between 1000 Å and 5000 Å; at a pressure of 3.5 MPa produces a crude product having a viscosity content of at most 50% of hydrocarbon feed viscosity at 37.8° C. This example also demonstrates that a hydrocarbon feed having a viscosity of at least 1000 cSt at 37.8° C. may be contacted at low pressures without plugging the catalyst and/or producing an unstable product. For example, the P-value during contacting was 1.2 and 0.007% of sediment by weight was produced.

Example 3

Contact of a Hydrocarbon Feed with a Column 6 Metal(s) Catalyst

The hydrocarbon feed, catalyst, contacting conditions, and sulfidation were the same as Example 2 except that the pressure during operation (1389 hours) was about 7 MPa. As shown in Table 2, the crude product had a viscosity of 65 cSt at 37.8° C.

Comparison of the data from Examples 2 and 3 demonstrates that contacting of the hydrocarbon feed at a pressure of 3.5 MPa and at temperatures between 400° C. and 420° C. produces a crude product with enhanced viscosity reduction with less hydrogen consumption was observed as compared to the crude product obtained at higher pressure and the same temperature. Operating at lower pressures provides an economic advantage as less hydrogen is required to operate the contacting system.

Comparative Example

The hydrocarbon feed, contacting conditions, and sulfidation were the same as Example 2.

A commercial bimodal molybdenum/nickel catalyst (RM 5030, Criterion Catalysts & Technologies, Houston, Tex., 24 cm$^3$) used for upgrading resid was prepared, mixed with silicone carbide (30 cm$^3$ for a total catalyst/silicone carbide mixture of 54 cm$^3$), and the mixture was positioned in the contacting zone. The run was terminated at 1872 hours due to a rapid increase in pressure change (inlet pressure of greater than 13 MPa (about 1872 psig). Rapid increase in pressure was attributed to the catalyst being plugged from high levels of sediment and/or precipitation of some of the product due to the P-value being less than 1.

In comparing Examples 2 and 3 with the comparative Example, the crude products have similar values for all the Examples. The contact time for Examples 2 and 3 are significantly longer than the contact time for the comparative example. As such, it may be concluded that the contact of the hydrocarbon feed with hydrogen in the presence of the bimodal catalyst prepared as described in Example 1 may be done at low pressures and high temperatures for longer periods of time than the comparative catalyst at the same temperatures and pressures.

TABLE 2

| Property | Feed | Crude Product Example | | |
| --- | --- | --- | --- | --- |
|  |  | 2 | 3 | Comparative |
| Contact Time, hours |  | 3436 | 3436 | 1872 |
| Pressure, MPa |  | 3.5 MPa | 7 MPa | 3.5 MPa |
| API Gravity | 7.9 | 14.9 | 16.3 | 15.8 |
| Density at 15.56° C. (60° F.), g/cm$^3$ | 1.0149 | 0.9633 | 0.9573 | 0.9608 |
| Hydrogen, wt % | 10.109 | 10.645 | 11.015 | 10.617 |
| Carbon, wt % | 81.987 | 84.25 | 84.6 | 84.617 |
| Sulfur, wt % | 6.687 | 4.473 | 3.701 | 3.782 |

TABLE 2-continued

| Property | Feed | Crude Product Example 2 | 3 | Comparative 5 |
|---|---|---|---|---|
| Oxygen, wt % | 0.62 | 0.27 | 0.315 | * |
| Nitrogen, wt % | 0.366 | 0.362 | 0.369 | 0.385 |
| Nickel, wtppm | 70 | 60 | 39 | 56 |
| Iron, ppm | 2.4 | 0.2 | 0.2 | 0.2 |
| Vanadium, wtppm | 205 | 180 | 90 | 152 |
| Calcium, wtppm | 6.7 | 1.4 | 0.3 | 2.1 |
| Copper, wtppm | 0.9 | 0.4 | 0.2 | 0.2 |
| Chromium, wtppm | 0.3 | 0.2 | 0.2 | 0.2 |
| Silicon, wtppm | 1.2 | 0.3 | 0.3 | 0.3 |
| Magnesium, wtppm | 0.8 | 0.4 | 0.2 | 0.4 |
| Zinc, wtppm | 6.0 | 0.9 | 0.7 | 1.7 |
| Molybdenum, wtppm | 6.6 | 0.3 | 0.4 | 0.8 |
| Micro-Carbon Residue, wt % | 12.5 | 10.3 | 9.0 | 9.6 |
| $C_5$ Asphaltenes, wt % | 16.2 | 7.5 | 6.0 | 8.0 |
| $C_7$ Asphaltenes, wt % | 10.9 | 5.2 | 3.9 | 5.1 |
| Naphtha, wt % | | 5.8 | 5.9 | 5.1 |
| Distillate, wt % | 15.0 | 29.5 | 29.4 | 30.7 |
| VGO, wt % | 37.5 | 39.6 | 40.2 | 39.8 |
| Residue, wt % | 47.4 | 25.1 | 24.5 | 24.4 |
| P-Value | 2.6 | 1.2 | 1.2 | <1.0 |
| Viscosity at 37.8° C. (100° F.), cSt | 8357 | 58 | 65 | 51.4 |
| Hydrogen Consumption, $Nm^3/m^3$ | | 55.17 | 104.5 | * |
| Sediment, wt % | | 0.007 | 0.008 | plugged |

* Not Determined

What is claimed is:

1. A method of producing a crude product, comprising:
contacting a hydrocarbon feed with a catalyst to produce a total product that includes the crude product, wherein the catalyst comprises a metal from Col. 6-10 of the Periodic Table, or a compound thereof, or a mixture of the metal and a compound thereof; wherein the catalyst has a median pore diameter ranging from 105 Å to 150 Å with at least 60% of the total number of pores in the pore size distribution having a pore diameter within at least 60 Å of the median pore diameter, with at least 50% of its pore volume in pores having a pore diameter of at most 600 Å, and between 5% and 25% of its pore volume in pores having a pore diameter between 1000 Å and 5000 Å, wherein pore diameters and pore volumes are as measured by ASTM Method D4284.

2. The method of claim 1, wherein the crude product is a liquid mixture at 25° C. and 0.101 MPa.

3. The method of claim 1, wherein the hydrocarbon feed has a viscosity of at least 100 cSt at 37.8° C. and the crude product is a liquid mixture at 25° C. and 0.101 MPa, and the method further comprises controlling contacting conditions such that the crude product has a viscosity at 37.8° C. of at most 90% of the viscosity of the hydrocarbon feed at 37.8° C., wherein viscosity is as determined by ASTM Method D445.

4. The method of claim 1, further comprises controlling contacting conditions at a total pressure at most 5 MPa and a temperature of at least 200° C.

5. The method of claim 1, wherein the crude product has a sediment content of at most 0.01 gram per gram of crude product.

6. The method of claim 1, wherein the method further comprises fractionating the crude product into one or more distillate fractions, and producing transportation fuel from at least one of the distillate fractions.

7. The method of claim 1 wherein the pore volume in pores of the catalyst is from 0.3 $cm^3/g$ to 0.99 $cm^3/g$.

8. The method of claim 1 wherein the catalyst has a surface area of at least 200 $m^2/g$ as determined by ASTM Method D3663.

9. The method of claim 1 wherein the catalyst is sulfided prior to contact with the hydrocarbon feed.

10. The method of claim 1 wherein the catalyst is sulfided by contact of the catalyst with the hydrocarbon feed.

11. The method of claim 1 wherein the catalyst is obtained by co-mulling the Col. 6-10 metal with a support selected from the group consisting of alumina, silica-alumina, titanium oxide, zirconium oxide, magnesium oxide, and mixtures thereof.

12. The method of claim 1 wherein the catalyst has a bimodal pore size distribution.

* * * * *